United States Patent
Shima et al.

(10) Patent No.: US 9,446,489 B2
(45) Date of Patent: Sep. 20, 2016

(54) WELDING STRUCTURE AND WELDING METHOD USING THREE POSITIONING PORTIONS

(75) Inventors: Kenta Shima, Miyoshi (JP); Atsushi Kawakita, Miyoshi (JP); Tomohiko Sekiguchi, Aichi-gun (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 431 days.

(21) Appl. No.: 13/817,313

(22) PCT Filed: Aug. 19, 2011

(86) PCT No.: PCT/IB2011/001913
§ 371 (c)(1),
(2), (4) Date: Apr. 8, 2013

(87) PCT Pub. No.: WO2012/023034
PCT Pub. Date: Feb. 23, 2012

(65) Prior Publication Data
US 2013/0187323 A1 Jul. 25, 2013

(30) Foreign Application Priority Data
Aug. 20, 2010 (JP) .............................. 2010-185345

(51) Int. Cl.
*B23Q 3/00* (2006.01)
*B23K 31/02* (2006.01)
(Continued)

(52) U.S. Cl.
CPC .............. *B23Q 3/00* (2013.01); *B23K 31/02* (2013.01); *B23K 33/004* (2013.01);
(Continued)

(58) Field of Classification Search
CPC .... B21D 39/032; B23K 33/00; B23K 37/04; B23K 2201/18; B23K 31/02; B23K 33/004; F16B 17/008; F16B 5/08; F16B 21/09; F16B 5/0004; F16B 5/07
See application file for complete search history.

(56) References Cited

U.S. PATENT DOCUMENTS

| | | | | |
|---|---|---|---|---|
| 3,534,466 A | * | 10/1970 | Ardolino et al. | 29/509 |
| 3,591,117 A | * | 7/1971 | Mazzetti | 248/220.43 |
| 2013/0129411 A1 | * | 5/2013 | Shima et al. | 403/270 |

FOREIGN PATENT DOCUMENTS

| EP | 2 154 054 A1 | 2/2010 | | |
|---|---|---|---|---|
| EP | 2154054 A1 | * | 2/2010 | ............ B23K 37/04 |

(Continued)

OTHER PUBLICATIONS

JP 2003-329017 A—Nov. 2003—English Machine Translation.*
(Continued)

*Primary Examiner* — Joseph J Hail
*Assistant Examiner* — Marc Carlson
(74) *Attorney, Agent, or Firm* — Oblon, McClelland, Maier & Neustadt, L.L.P.

(57) ABSTRACT

A welding structure includes a sheet-shaped first part to be welded; a sheet-shaped second part to be welded that is positioned with respect to the first part to be welded by engaging with the first part to be welded, to perform welding; and a first positioning portion, a second positioning portion, and a third positioning portion, at which the first and second parts to be welded engage with each other. The first to third positioning portions are each configured to restrict movement of one of the first and second parts to be welded in a positioning direction, with respect to the other, and enable movement of the one in a movable direction perpendicular to the positioning direction, with respect to the other. The movable direction of each of the first and second positioning portions is the same direction as the positioning direction of the third positioning portion.

9 Claims, 10 Drawing Sheets

(51) Int. Cl.
    *B23K 33/00*     (2006.01)
    *F16B 5/00*     (2006.01)
    *F16B 5/07*     (2006.01)
    *F16B 5/08*     (2006.01)
    *F16B 17/00*     (2006.01)
    *F16B 21/09*     (2006.01)

(52) U.S. Cl.
    CPC .............. *F16B 5/0004* (2013.01); *F16B 5/07* (2013.01); *F16B 5/08* (2013.01); *F16B 17/008* (2013.01); *F16B 21/09* (2013.01); *B23K 2201/18* (2013.01)

(56) References Cited

FOREIGN PATENT DOCUMENTS

| | | | |
|---|---|---|---|
| JP | 62-176508 U | 11/1987 | |
| JP | 64-54985 U | 4/1989 | |
| JP | 4-127926 A | 4/1992 | |
| JP | 04127926 A * | 4/1992 | ............ B21D 39/03 |
| JP | 4-351276 | 12/1992 | |
| JP | 5-78376 U | 10/1993 | |
| JP | 6-20955 U | 3/1994 | |
| JP | 2003-103376 | 4/2003 | |
| JP | 2003103376 A * | 4/2003 | ............ B23K 11/14 |
| JP | 2003-329017 | 11/2003 | |
| JP | 2003329017 A * | 11/2003 | ............... F16B 5/10 |
| JP | 2005-9560 | 1/2005 | |
| JP | 2005009560 A * | 1/2005 | ............... F16B 5/07 |
| WO | WO 2012/017311 A2 | 2/2012 | |
| WO | WO 2012/017311 A3 | 2/2012 | |

OTHER PUBLICATIONS

U.S. Appl. No. 13/814,040, filed Feb. 4, 2013, Shima et al.
International Search Report and Written Opinion of the International Searching Authority issued Dec. 16, 2011, in PCT/IB2011/001913.
Office Action issued Sep. 2, 2014 in Chinese Patent Application No. 201180039835.2 (English language translation only).

* cited by examiner

RELATED ART

WELDING STRUCTURE AND WELDING METHOD USING THREE POSITIONING PORTIONS

BACKGROUND OF THE INVENTION

1. Field of the Invention

The invention relates to a welding structure and a welding method. More particularly, the invention relates to technology that improves the positioning accuracy of sheet-shaped members when welding the members together.

2. Description of Related Art

Japanese Utility Model Application Publication No. 5-78376 (JP-U-5-78376) and Japanese Patent Application Publication No. 2003-103376 (JP-A-2003-103376), for example, describe technology in which, when welding sheet-shaped members together, a plurality of circular holes are provided in one part to be welded, and a plurality of round protruding portions are provided, in positions corresponding to the circular holes, on another part to be welded. The other part is positioned with respect to the one part with the protruding portions fitted into the circular holes, and the welding is then performed.

When positioning the sheet-shaped members by fitting the plurality of protruding portions into the plurality of circular holes, as in the technology described in JP-U-5-78376 and JP-A-2003-103376, it may be difficult to ensure the necessary accuracy of the circular holes and the protruding portions during the positioning of the sheet-shaped members.

Figure 10A:
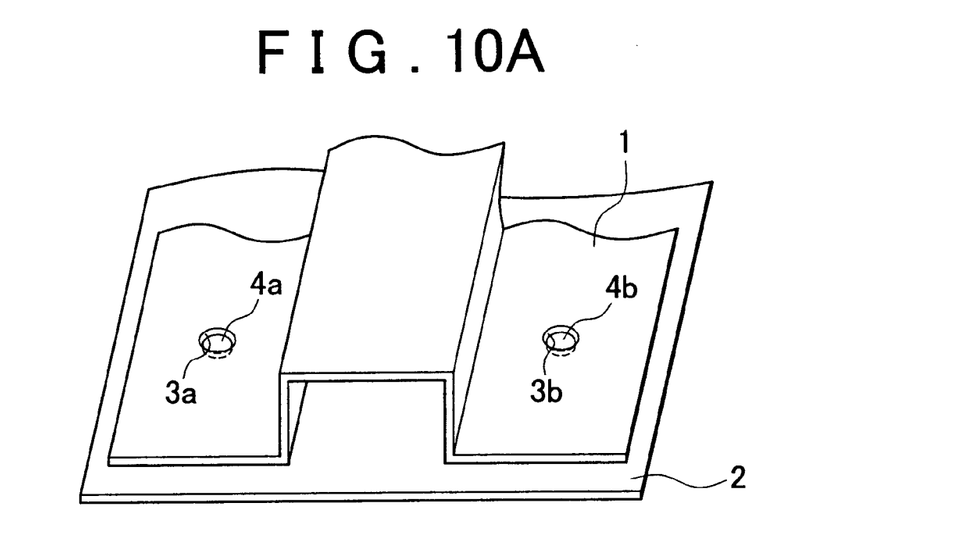
FIG. 10A is a perspective view of a welding structure according to related art.

One example of a case in which it is difficult to ensure the positioning accuracy of the sheet-shaped members will now be described with reference to FIGS. 10A to 10C. FIG. 10A is a view of a welding structure when a sheet-shaped member 1 is welded to a sheet-shaped member 2. When welding the sheet-shaped member 1 to the sheet-shaped member 2, circular holes 3a and 3b are opened in two locations in the sheet-shaped member 1, and round protruding portions 4a and 4b are provided in two locations, in positions corresponding to the circular holes 3a and 3b, on the sheet-shaped member 2. As shown in FIG. 10A, the sheet-shaped member 1 is positioned with respect to the sheet-shaped member 2 while the protruding portions 4a and 4b are fitted into the circular holes 3a and 3b, respectively, and welding is then performed.

In FIG. 10A, the sectional shape of the sheet-shaped member 1 is formed in two opposing crank shapes with a common side. Hereinafter, this sectional shape will be referred to as a "hat-shaped cross-section", and a sheet-shaped member having such a sectional shape will be referred to as a "hat-shaped cross-section part." In other words, a hat-shaped cross-section part is a sheet-shaped member having a groove formed in the length direction.

Figure 10B:
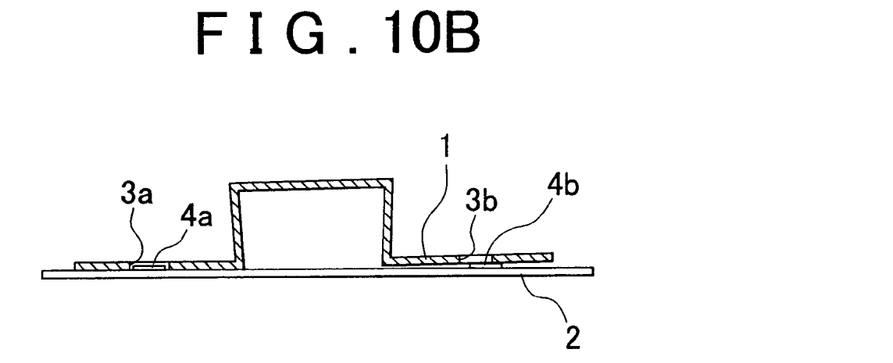
FIGS. 10B and 10C are sectional views of the welding structure according to related art.
Figure 10C:
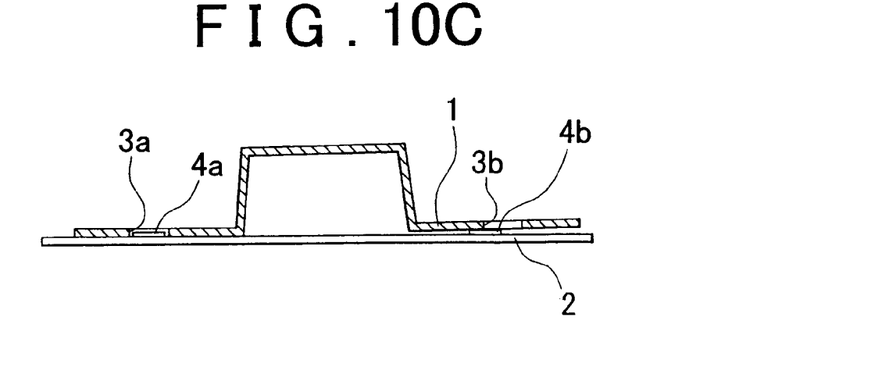

The sectional shape of the hat-shaped cross-section part (i.e., the sheet-shaped member) 1 may change in a direction perpendicular to the direction in which the groove is formed (i.e., perpendicular to the depth direction of the groove), as shown in FIGS. 10B and 10C, due to a change in which a bend in press-forming returns (so-called spring back) or the like. In this case, when aligning one circular hole 3a with the corresponding protruding portion 4a while positioning the hat-shaped cross-section part 1 with respect to the sheet-shaped member 2, the positions of the other circular hole 3b and the other protruding portion 4b become off from each other, as shown in FIGS. 10B and 10C. That is, it is no longer possible to ensure the accuracy of the relative positions of the circular holes 3a and 3b and the protruding portions 4a and 4b.

SUMMARY OF THE INVENTION

This invention provides a welding structure and a welding method that ensure the positioning accuracy of parts to be welded even when welding a member whose shape changes, such as a hat-shaped cross-section part, for example.

A first aspect of the invention relates to a welding structure. This welding structure includes a sheet-shaped first part to be welded; a sheet-shaped second part to be welded that is positioned with respect to the first part to be welded by engaging with the first part to be welded, in order to weld the second part to be welded to the first part to be welded; and a first positioning portion, a second positioning portion, and a third positioning portion, at which the first part to be welded engages with the second part to be welded. The first positioning portion, the second positioning portion, and the third positioning portion are each configured to restrict movement of one of the first part to be welded and the second part to be welded in a positioning direction that is one direction, with respect to the other of the first part to be welded and the second part to be welded, and enable movement of the one of the first part to be welded and the second part to be welded in a movable direction that is perpendicular to the positioning direction, with respect to the other of the first part to be welded and the second part to be welded. Also, the first positioning portion, the second positioning portion, and the third positioning portion are arranged such that the movable direction of each of the first positioning portion and the second positioning portion is the same direction as the positioning direction of the third positioning portion.

In this aspect, the first positioning portion, the second positioning portion, and the third positioning portion may be arranged such that a distance between the first positioning portion and the second positioning portion in the movable direction is greater than a distance between the first positioning portion and the second positioning portion in the positioning direction, and a distance between the first positioning portion and the second positioning portion is greater than whichever is smaller of a distance between the first positioning portion and the third positioning portion, and a distance between the second positioning portion and the third positioning portion.

A second aspect of the invention relates to a welding method. This welding method includes positioning a sheet-shaped second part to be welded with respect to a sheet-shaped first part to be welded by engaging the first part to be welded with the second part to be welded at a first positioning portion, a second positioning portion, and a third positioning portion; and welding the first part to be welded to the second part to be welded. In this welding method, the first positioning portion, the second positioning portion, and the third positioning portion are each configured to restrict movement of one of the first part to be welded and the second part to be welded in a positioning direction that is one direction, with respect to the other of the first part to be welded and the second part to be welded, and enable movement of the one of the first part to be welded and the second part to be welded in a movable direction that is perpendicular to the positioning direction, with respect to the other of the first part to be welded and the second part to be welded. Also, the first positioning portion, the second positioning portion, and the third positioning portion are arranged such that the movable direction of each of the first positioning portion and the second positioning portion is the same direction as the positioning direction of the third positioning portion.

In this aspect described above, the first positioning portion, the second positioning portion, and the third positioning portion may be arranged such that a distance between the first positioning portion and the second positioning portion in the movable direction is greater than a distance between the first positioning portion and the second positioning portion in the positioning direction, and a distance between the first positioning portion and the second positioning portion is greater than whichever is smaller of a distance between the first positioning portion and the third positioning portion, and a distance between the second positioning portion and the third positioning portion.

The aspects of the invention described above make it possible to ensure the positioning accuracy of parts to be welded, even when welding a member in which the shape changes, such as a hat-shaped cross-section part, for example.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described. It should be noted that the technical scope of the invention is not limited to these example embodiments, but is broadly covering the entire range of technical aspects intended by the invention that are apparent from the points described and illustrated in this specification and the accompanying drawings.

First, a positioning portion 10 used in a welding structure according to a first example embodiment of the invention will be described with reference to FIGS. 1A and 1B. In this specification, to simplify the description, the upper side in FIGS. 1A and 1B will be referred to as up with respect to the welding structure, the right side in FIGS. 1A and 1B will be referred to as the right side of the welding structure, and the side away from the surface of the paper on which FIGS. 1A and 1B are drawn will be referred to as the front of the welding structure, as indicated by the arrows in FIG. 1B.

Figure 1A:
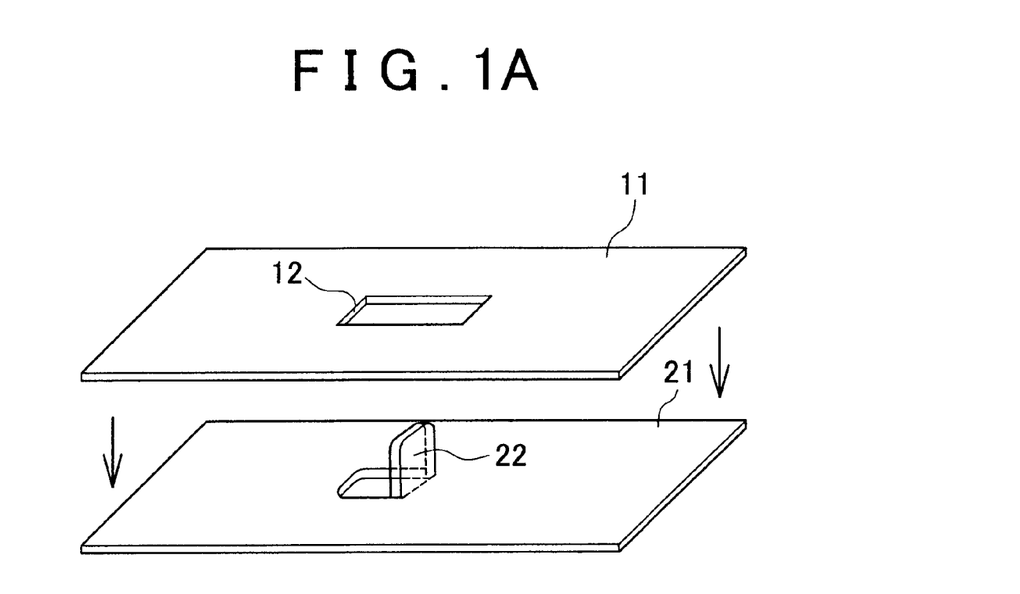
FIG. 1A is a perspective view of parts to be welded that are used in a welding structure according to a first example embodiment of the invention.
Figure 1B:
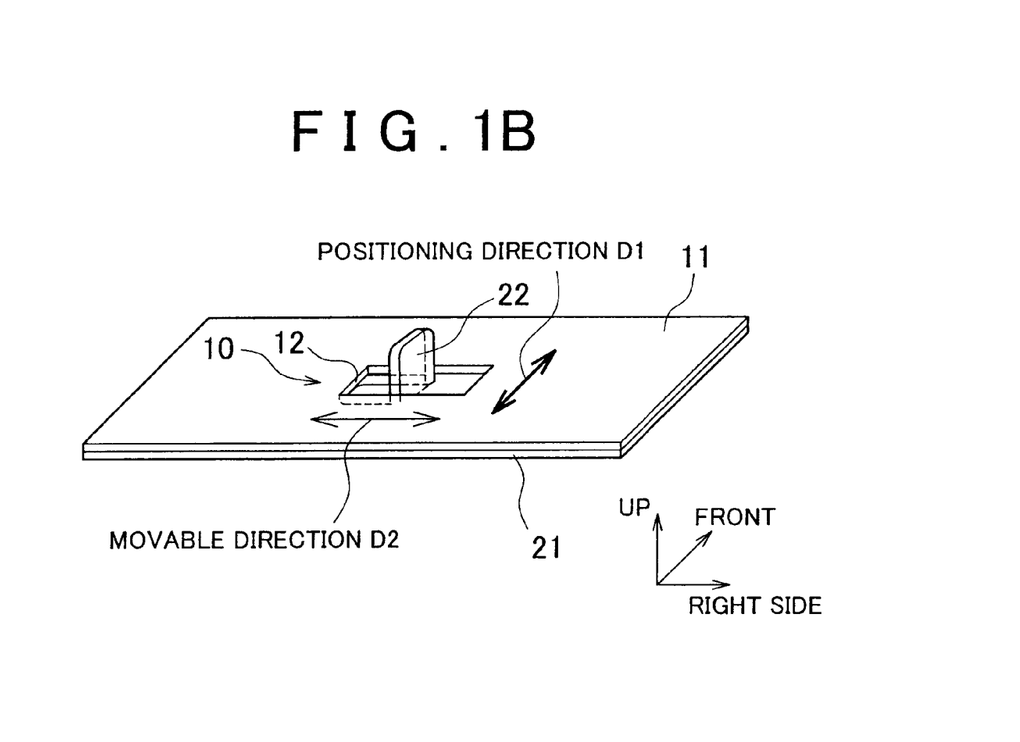
FIG. 1B is a perspective view of the structure of a positioning portion.

As shown in FIGS. 1A and 1B, the welding structure according to this example embodiment is used to position a sheet-shaped second part to be welded 21 with respect to a sheet-shaped first part to be welded 11, and weld the first part to be welded 11 to the second part to be welded 21.

A rectangular hole 12 is opened in the first part to be welded 11, while a pawl-shaped protruding portion 22 is formed on the second part to be welded 21, by cutting out and bending up (raising) a portion in a U-shape. The front-back width of this protruding portion 22 is substantially the same as, or slightly smaller than the front-back width of the hole 12. The protruding portion 22 of the second part to be welded 21 is inserted into the hole 12 of the first part to be welded 11, as shown by the arrows in FIG. 1A, thus forming a positioning portion 10, as shown in FIG. 1B. Then, with the protruding portion 22 engaged with the hole 12 at this positioning portion 10, the second part to be welded 21 is positioned with respect to the first part to be welded 11 and welding is performed.

In the positioning portion 10 structured as described above, the front-back width of the protruding portion 22 is substantially the same as, or slightly smaller than the front-back width of the hole 12. Therefore, movement of the first part to be welded 11 with respect to the second part to be welded 21 in the front-back direction is restricted. That is, even if the first part to be welded 11 tries to move in the front-back direction with respect to the second part to be welded 21, the front end portion and the rear end portion of the protruding portion 22 will abut against the front side and the rear side of the inner peripheral surface of the hole 12, so the first part to be welded 11 is only able to move within a small range with respect to the second part to be welded 21.

On the other hand, the positioning portion 10 is formed such that the first part to be welded 11 is able to move in the left-right direction with respect to the second part to be welded 21. That is, because the left-right length that is the sheet thickness of the protruding portion 22 is much smaller than the left-right length of the hole 12, when the first part to be welded 11 tries to move in the left-right direction with respect to the second part to be welded 21, the first part to be welded 11 is not restricted from moving with respect to the second part to be welded 21 in the left-right direction, and is instead able to move within the range of the left-right width of the hole 12.

As described above, in the positioning portion 10, the first part to be welded 11 is restricted from moving in one direction with respect to the second part to be welded 21. In this specification, the direction in which movement is restricted in this way will be referred to as a positioning direction D1 as shown in FIG. 1B. Also, the positioning portion 10 is formed such that the first part to be welded 11 is able to move in a direction orthogonal to the positioning direction D1 with respect to the second part to be welded 21.

In this specification, the direction in which movement is possible in this way will be referred to as a movable direction D2 as shown in FIG. 1B.

That is, in FIGS. 1A and 1B, the positioning portion 10 is formed such that the positioning direction D1 is the front-back direction, and the movable direction D2 is the left-right direction. The direction in which the positioning portion 10 is arranged is not limited to this. That is, the positioning portion 10 may also be formed such that the positioning direction D1 is the left-right direction and the movable direction D2 is the front-back direction.

Figure 3A:
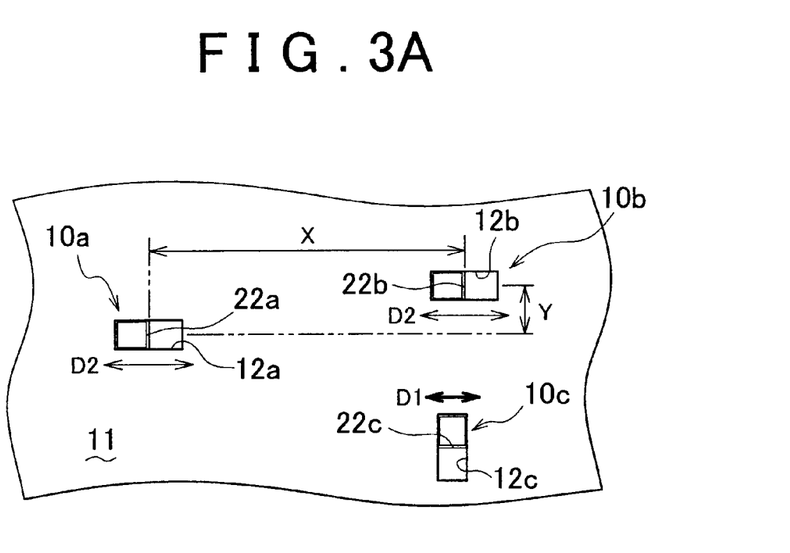
FIG. 3A is a plan view of a first arrangement of positioning portions.
Figure 3B:
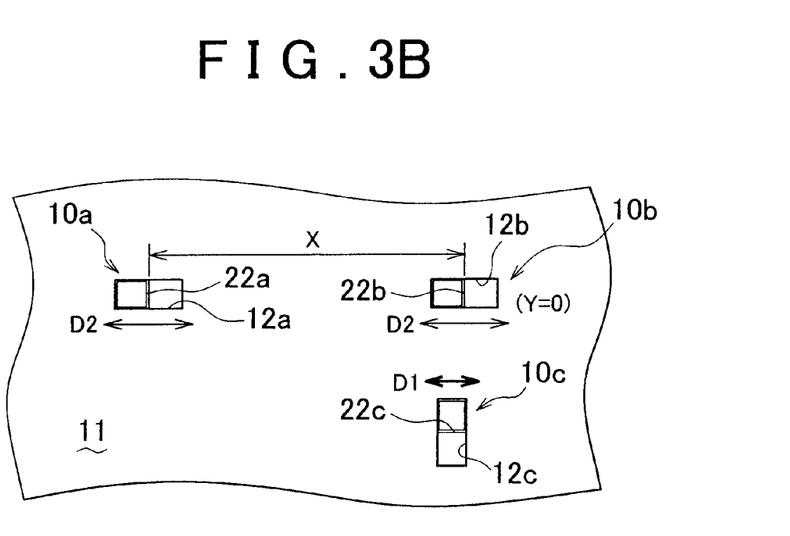
FIG. 3B is a plan view of a second arrangement of positioning portions.

In the welding structure according to this example embodiment, three holes 12 (i.e., holes 12a to 12c) are opened in the first part to be welded 11, as shown in FIGS. 3A, 3B, and the protruding portions 22 (i.e., protruding portions 22a to 22c) are formed, in three locations corresponding to the holes 12, on the second part to be welded 21. Thus, three of the positioning portions 10 (i.e., positioning portions 10a to 10c) are formed, and the first part to be welded 11 is engaged with second part to be welded 21 at the positioning portions 10a to 10c. As a result, positioning is performed suppressing relative rotation between the first part to be welded 11 and the second part to be welded 21, and the first part to be welded 11 is welded to the second part to be welded 21.

At the three positioning portions 10a to 10c structured as described above, the positioning direction D1 or the movable direction D2 is either the front-back direction or the left-right direction to facilitate designing. At this time, if the positioning directions D1 of the positioning portions 10a to 10c are the same direction (e.g., the front-back direction), the part to be welded would be unable to be positioned in the movable direction D2 (i.e., the left-right direction). Therefore, the positioning direction of one of the three positioning portions 10a to 10c is made orthogonal to the positioning direction of each of the other positioning portions.

In this example embodiment, the two positioning portions that have the same positioning direction D1 are the first positioning portion 10a and the second positioning portion 10b, while the one positioning portion having the positioning direction D1 that is orthogonal to the positioning direction D1 of each of the first positioning portion 10a and the second positioning portion 10b is the third positioning portion 10c (see FIGS. 3A, 3B). That is, the movable direction D2 of each of the first positioning portion 10a and the second positioning portion 10b, and the positioning direction D1 of the third positioning portion 10c are the same direction.

Figure 2A:
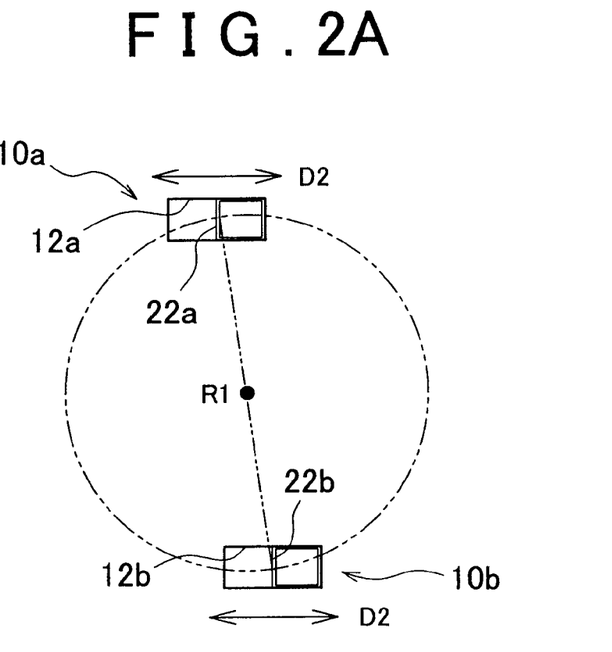
FIGS. 2A and 2B are views of the relationship between the arrangement of positioning portions and the rotation of a member to be welded.

When the first positioning portion 10a and the second positioning portion 10b that have the same movable direction D2 are arranged substantially parallel to each other in the movable direction D2 as shown in FIG. 2A (i.e., when the first positioning portion 10a and the second positioning portion 10b that have the same movable direction D2 are arranged such that the distance between the first positioning portion 10a and the second positioning portion 10b in the movable direction D2 is less than the distance in the positioning direction D1), if a circle that passes through the first positioning portion 10a and the second positioning portion 10b with a center R1 between the first positioning portion 10a and the second positioning portion 10b as the center is envisioned, the circumferential direction of the circle and the movable direction D2 are substantially the same direction.

Therefore, if an attempt is made to rotate the first part to be welded 11 about the center R1 with respect to the second part to be welded 21, the first part to be welded 11 will move in the movable direction D2 relative to the second part to be welded 21 at the first positioning portion 10a and the second positioning portion 10b, so the first part to be welded 11 is able to rotate relative to the second part to be welded 21. In this way, if the distance between the first positioning portion 10a and the second positioning portion 10b in the movable direction D2 is less than the distance in the positioning direction D1, the first part to be welded 11 will be able to rotate easily about the center R1 with respect to the second part to be welded 21 at the first positioning portion 10a and the second positioning portion 10b.

Figure 2B:
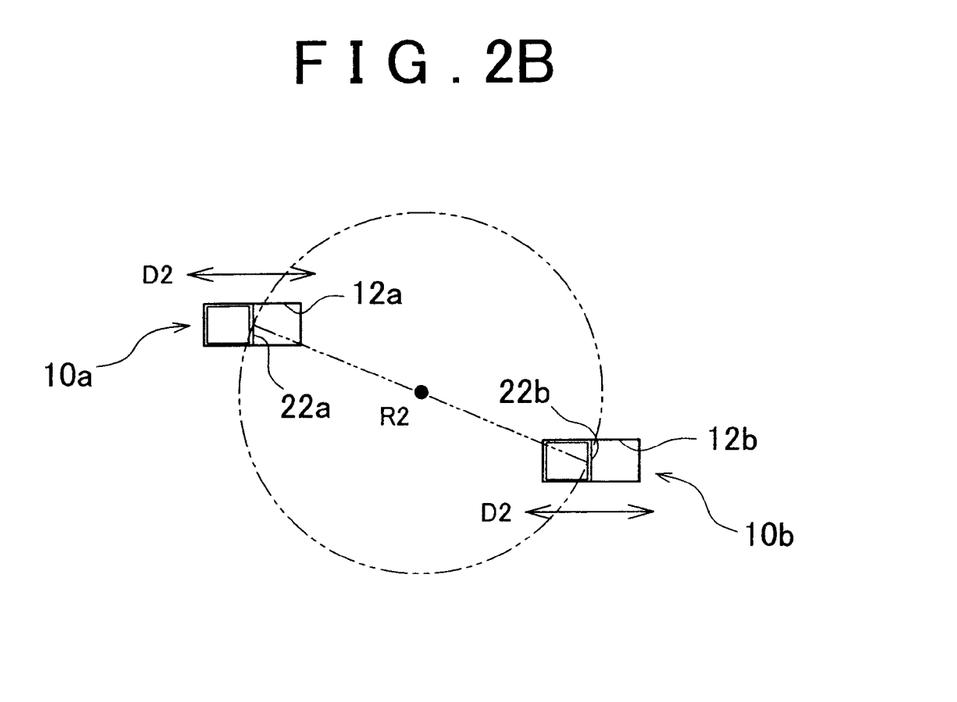

On the other hand, when the first positioning portion 10a and the second positioning portion 10b are arranged on a substantially straight line in the movable direction D2 as shown in FIG. 2B (i.e., when the first positioning portion 10a and the second positioning portion 10b are arranged such that the distance between the first positioning portion 10a and the second positioning portion 10b in the movable direction D2 is greater than the distance in the positioning direction D1), if a circle that passes through the first positioning portion 10a and the second positioning portion 10b with a center R2 as the center is envisioned, the circumferential direction of the circle and the movable direction D2 are different directions.

Therefore, for example, if an attempt is made to rotate the first part to be welded 11 about the center R2 with respect to the second part to be welded 21, the first part to be welded 11 will try to move in a direction that is different from the movable direction D2 relative to the second part to be welded 21 at the first positioning portion 10a and the second positioning portion 10b, so this movement is restricted. As a result, the first part to be welded 11 is prevented from rotating relative to the second part to be welded 21. In this way, when the distance between the first positioning portion 10a and the second positioning portion 10b in the movable direction D2 is greater than the distance in the positioning direction D1, the first part to be welded 11 is able to be prevented from rotating relative to the second part to be welded 21 about the center R2 at the first positioning portion 10a and the second positioning portion 10b.

As a result, in this example embodiment, in order to prevent the first part to be welded 11 from rotating relative to the second part to be welded 21, the first positioning portion 10a and the second positioning portion 10b are arranged such that a distance X between the first positioning portion 10a and the second positioning portion 10b in the movable direction D2 is greater than a distance Y between the first positioning portion 10a and the second positioning portion 10b in the positioning direction D1, as shown in FIG. 3A. As a result, the first part to be welded 11 is able to be prevented from rotating relative to the second part to be welded 21 about the center between the first positioning portion 10a and the second positioning portion 10b.

From this perspective, in order to prevent the first part to be welded 11 from rotating relative to the second part to be welded 21 about the center between the first positioning portion 10a and the second positioning portion 10b, it is desirable to arrange the first positioning portion 10a and the second positioning portion 10b on the same straight line extending in the movable direction D2 of each of the first positioning portion 10a and the second positioning portion 10b, with a distance Y between the first positioning portion 10a and the second positioning portion 10b in the positioning direction D1 set at 0 (i.e., Y=0), as shown in FIG. 3B.

Figure 4:
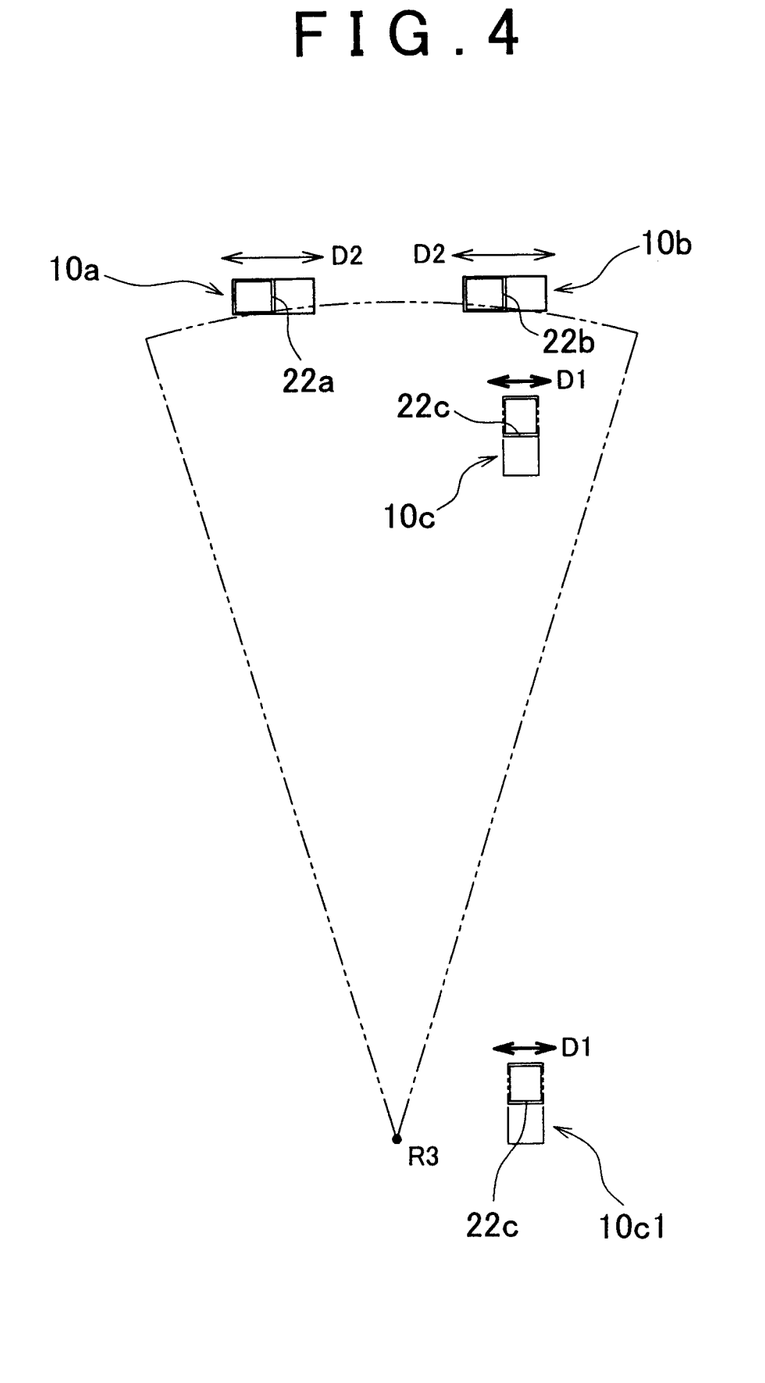
FIG. 4 is a view of the relationship between the arrangement of positioning portions and a member to be welded.

For the first positioning portion 10a and the second positioning portion 10b that have the same movable direction D2, if a circle that passes through the first positioning portion 10a and the second positioning portion 10b with a point R3 a substantially equal predetermined distance away from the first positioning portion 10a and the second positioning portion 10b as the center (i.e., if a circle that passes through the first positioning portion 10a and the second positioning portion 10b, and in which the radial dimension (i.e., the distance between the first positioning portion 10a and the second positioning portion 10b, and the center R3) is greater than the distance between the first positioning portion 10a and the second positioning portion 10b) is envisioned, as shown in FIG. 4, the circumferential direction of the circle is substantially the same direction as the movable direction D2. In such a case, the first part to be welded 11 rotates easily about the point R3 with respect to the second part to be welded 21 at the first positioning portion 10a and the second positioning portion 10b.

That is, for example, if an attempt is made to rotate the first part to be welded 11 about the center R3 with respect to the second part to be welded 21, the first part to be welded 11 will move in the movable direction D2 relative to the second part to be welded 21 at the first positioning portion 10a and the second positioning portion 10b, so the first part to be welded 11 is able to rotate with respect to the second part to be welded 21.

At this time, even if a third positioning portion 10c1 is arranged near the point R3, as shown in FIG. 4, it is not possible to prevent the first part to be welded 11 from rotating with respect to the second part to be welded 21. That is, for example, if an attempt is made to move the first part to be welded 11 in the left-right direction with respect to the second part to be welded 21, movement in the left-right direction will be restricted by the positioning portion 10c1 where the left-right direction is the positioning direction D1 near the point R3. However, movement in the left-right direction will not be restricted at the first positioning portion 10a and the second positioning portion 10b where the left-right direction is the movable direction D2. Also, the circumferential direction of the circle that passes through the first positioning portion 10a and the second positioning portion 10b with the point R3 as the center is substantially the same direction as the movable direction D2 of each of the first positioning portion 10a and the second positioning portion 10b. Therefore, the first part to be welded 11 is able to rotate with respect to the second part to be welded 21, about an area (i.e., about the positioning portion 10c1) near the point R3.

On the other hand, if the third positioning portion 10c is arranged near the first positioning portion 10a and the second positioning portion 10b (i.e., if the third positioning portion 10c is arranged such that the smaller of the distance between the third positioning portion 10c and the first positioning portion 10a and the distance between the third positioning portion 10c and the second positioning portion 10b is less than the distance between the first positioning portion 10a and the second positioning portion 10b), the first part to be welded 11 is able to be prevented from rotating with respect to the second part to be welded 21. That is, when the third positioning portion 10c is arranged near the first positioning portion 10a and the second positioning portion 10b, if a circle that passes through the first positioning portion 10a and the second positioning portion 10b with the third positioning portion 10c as the center is envisioned, the circumferential direction of the circle will be different from the movable direction D2 of each of the first positioning portion 10a and the second positioning portion 10b.

Therefore, for example, if an attempt is made to rotate the first part to be welded 11 about the third positioning portion 10c with respect to the second part to be welded 21, the first part to be welded 11 will try to move in a direction that is different from the movable direction D2 relative to the second part to be welded 21 at the first positioning portion 10a and the second positioning portion 10b, so this movement is restricted. As a result, the first part to be welded 11 is prevented from rotating with respect to the second part to be welded 21. Similarly, for example, if an attempt is made to try to move the first part to be welded 11 in the left-right direction with respect to the second part to be welded 21, the left-right direction is the positioning direction D1 at the third positioning portion 10c, so movement in the left-right direction is restricted. Also, at the first positioning portion 10a and the second positioning portion 10b, the first part to be welded 11 tries to move in the circumferential direction of the circle that has the third positioning portion 10c, where movement in the left-right direction is restricted, as the center. However, this circumferential direction differs from the movable direction D2 of each of the first positioning portion 10a and the second positioning portion 10b, so this movement is restricted. Accordingly, the first part to be welded 11 is prevented from rotating with respect to the second part to be welded 21.

Figure 5A:
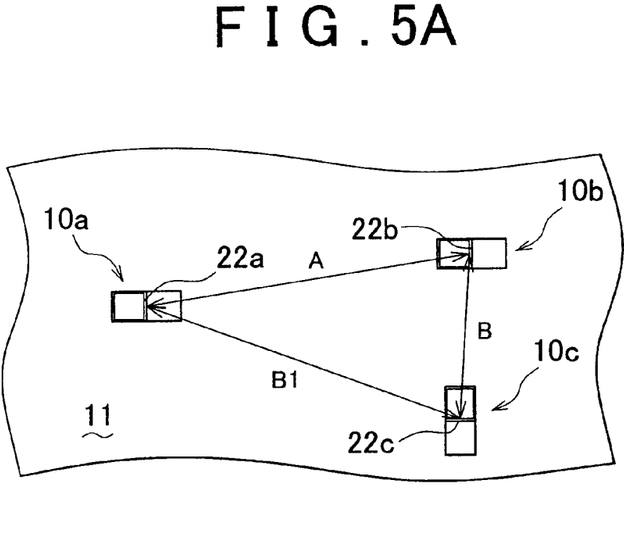
FIG. 5A is a plan view of a first arrangement of positioning portions.
Figure 5B:
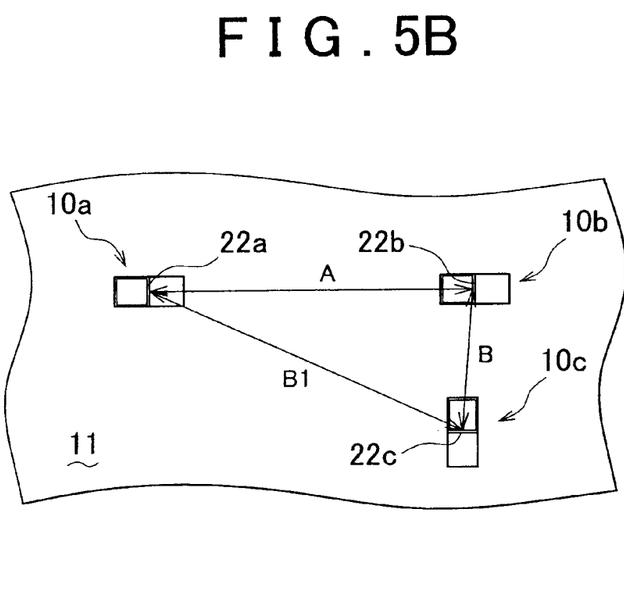
FIG. 5B is a plan view of a second arrangement of positioning portions.

As a result, in this example embodiment, in order to prevent rotation, the first positioning portion 10a, the second positioning portion 10b, and the third positioning portion 10c are arranged such that a distance A between the first positioning portion 10a and the second positioning portion 10b is greater than whichever is smaller of a distance B1 between the first positioning portion 10a and the third positioning portion 10c, and a distance B between the second positioning portion 10b and the third positioning portion 10c, as shown in FIGS. 5A and 5B. As a result, the first part to be welded 11 is able to be prevented from rotating about the third positioning portion 10c relative to the second part to be welded 21.

Figure 6:
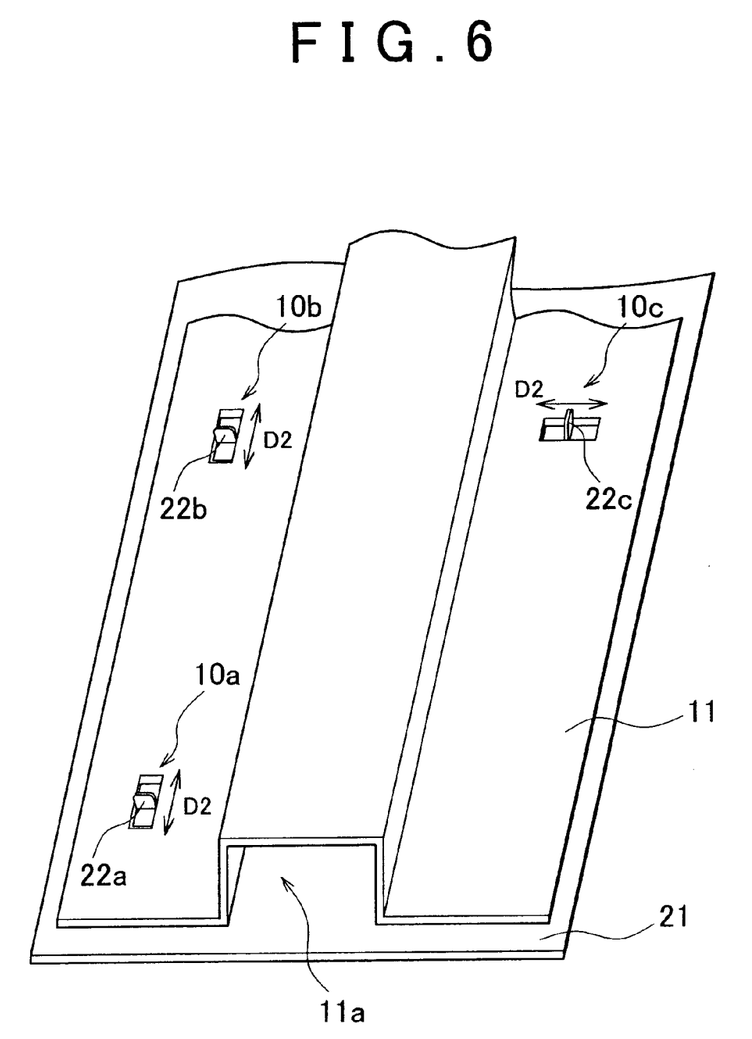
FIG. 6 is a perspective view of the welding structure according to the first example embodiment.

Next, a case in which the welding structure according to this example embodiment is applied to the hat-shaped cross-section part 11 will be described with reference to FIGS. 6 and 7A to 7C. As shown in FIG. 6, in this example embodiment, the hat-shaped cross-section part 11 that is the first part to be welded is positioned with respect to the sheet-shaped member 21 that is the second part to be welded, and then welding is performed.

In this example embodiment, as shown in FIG. 6, a groove 11a is formed in the length direction in the hat-shaped cross-section part 11. In other words, the hat-shaped cross-section part 11 has the groove 11a that extends in the length direction. The first positioning portion 10a and the second positioning portion 10b are arranged such that the movable direction D2 of each of the first positioning portion 10a and the second positioning portion 10b is parallel to the direction in which the groove 11a is formed (i.e., parallel to the length direction of the hat-shaped cross-section part 11). Also, the third positioning portion 10c is arranged such that the movable direction D2 thereof is perpendicular to the direction in which the groove 11a is formed.

Also, as described above, the first positioning portion 10a and the second positioning portion 10b are arranged so as to be on the same straight line that extends in the movable direction D2 of each of the first positioning portion 10a and the second positioning portion 10b. That is, the first positioning portion 10a and the second positioning portion 10b are arranged such that the distance between the first positioning portion 10a and the second positioning portion 10b in the movable direction D2 is greater than the distance between the first positioning portion 10a and the second positioning portion 10b in the positioning direction D1. Furthermore, the first positioning portion 10a, the second positioning portion 10b, and the third positioning portion 10c are arranged such that the distance A between the first positioning portion 10a and the second positioning portion 10b is greater than the distance B that is the smaller of the distance B1 between the first positioning portion 10a and the third positioning portion 10c, and the distance B between the second positioning portion 10b and the third positioning portion 10c. In this way, the first part to be welded 11 is prevented from rotating about the center between the first positioning portion 10a and the second positioning portion 10b, and from rotating about the third positioning portion 10c, with respect to the second part to be welded 21.

Figure 7A:
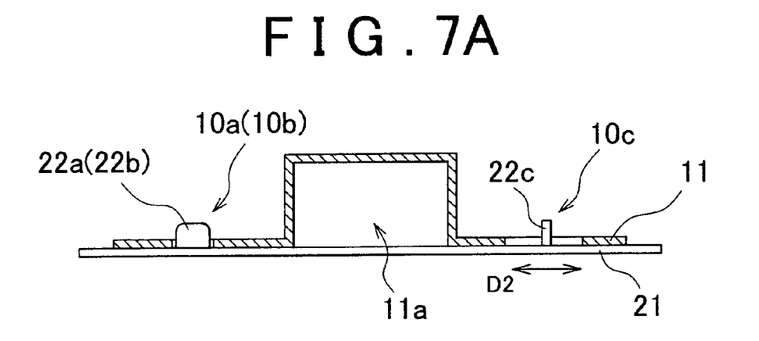
FIGS. 7A to 7C are sectional views of the welding structure according to the first example embodiment.

With the welding structure that is structured as described above, if a change in which a bend in the hat-shaped cross-section part 11 returns (i.e., spring back) does not occur, the hat-shaped cross-section part 11 will engage with the sheet-shaped member 21 at the positioning portions 10a to 10c, in the normal position as shown in FIG. 7A.

Figure 7B:
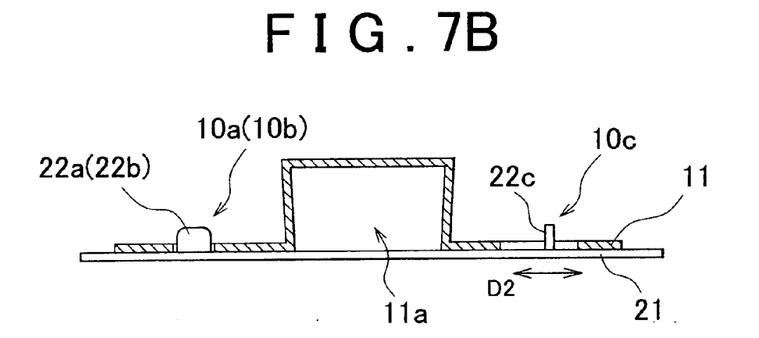
Figure 7C:
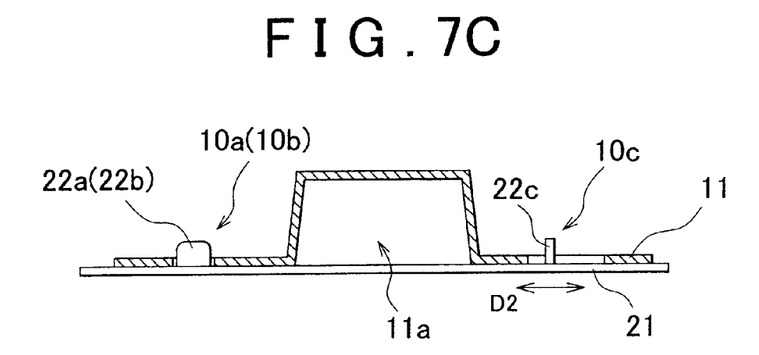

On the other hand, if spring back does occur in the hat-shaped cross-section part 11, the sectional shape of hat-shaped cross-section part 11 will change in a direction that is perpendicular to the direction in which the groove 11a is formed (i.e., in the left-right direction in FIGS. 7A to 7C), as shown in FIGS. 7B and 7C. However, because the movable direction D2 of the third positioning portion 10c is perpendicular to the direction in which the groove 11a is formed, when the hat-shaped cross-section part 11 is positioned with respect to the sheet-shaped member 21, the hat-shaped cross-section part 11 is able to engage with the sheet-shaped member 21 in a state in which one side of the hat-shaped cross-section part 11 is moved, as shown in FIGS. 7B and 7C. That is, the change in the shape of the hat-shaped cross-section part 11 is able to be absorbed by the third positioning portion 10c. Therefore, welding is possible even if spring back occurs in the hat-shaped cross-section part 11, so positioning accuracy of the hat-shaped cross-section part 11 with respect to the sheet-shaped member 21 is able to be ensured.

Next, a positioning portion 110 used in a welding structure according to a second example embodiment of the invention will be described with reference to FIGS. 8A and 8B. As indicated by the arrows in FIG. 8B, the upper side in FIG. 8A will be referred to as up with respect to the welding structure, the right side in FIG. 8A will be referred to as the right side of the welding structure, and the side away from the surface of the paper on which FIG. 8A is drawn will be referred to as the front of the welding structure.

Figure 8A:
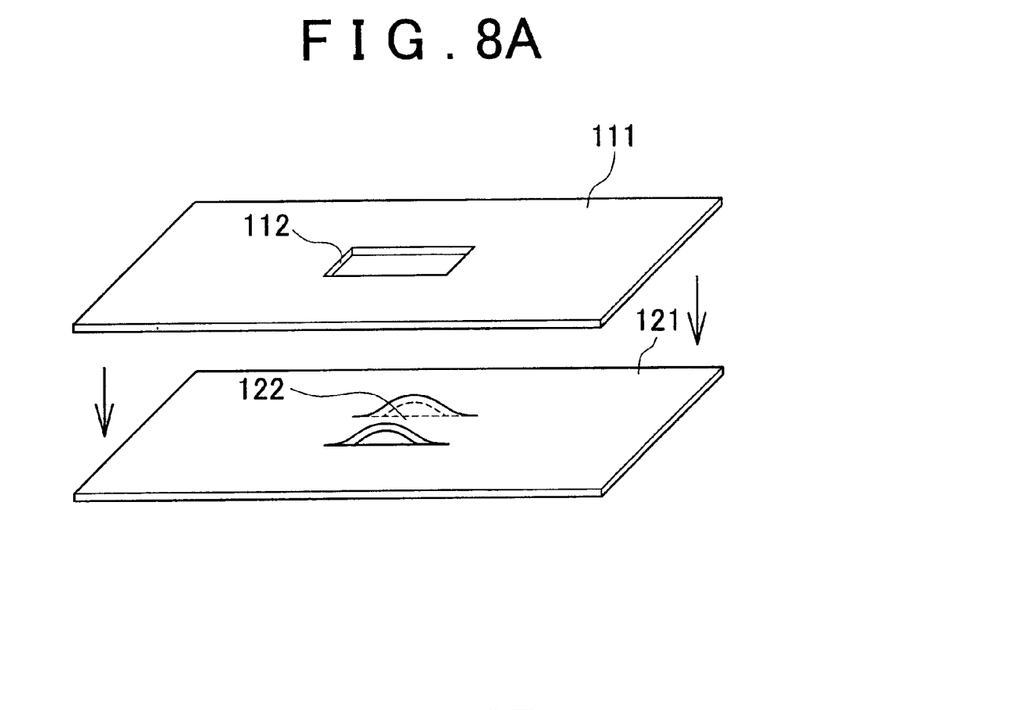
FIG. 8A is a perspective view of parts to be welded that are used in a welding structure according to a second example embodiment of the invention.
Figure 8B:
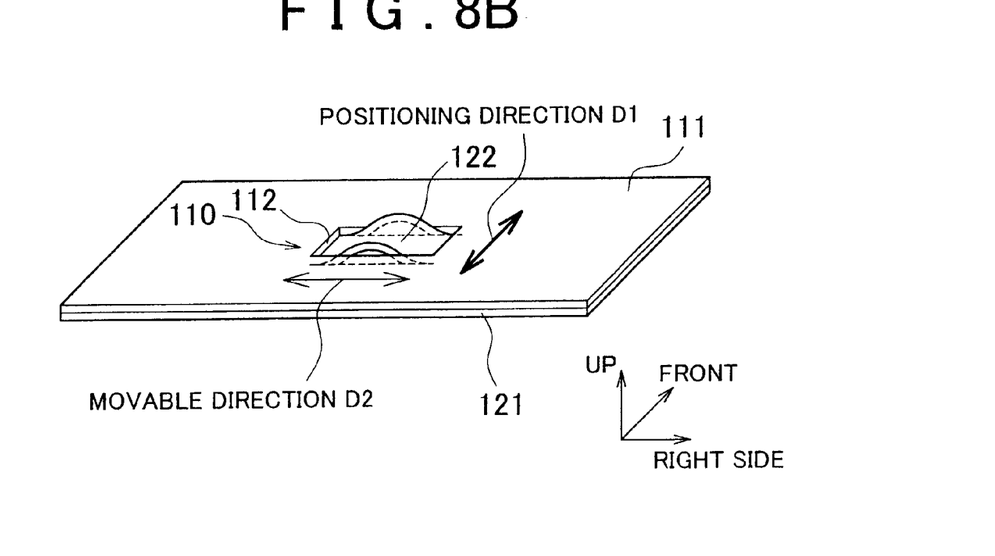
FIG. 8B is a perspective view of the structure of a positioning portion.

As shown in FIGS. 8A and 8B, the welding structure in this example embodiment is used to position a sheet-shaped second part to be welded 121 with respect to a sheet-shaped first part to be welded 111, and weld the first part to be welded 111 to the second part to be welded 121, similarly to the first example embodiment described above.

A rectangular hole 112 is opened in the first part to be welded 111, while two slits are formed at portions facing the pair of long sides of the hole 112, in positions corresponding to the hole 112 opened in the first part to be welded 111. A portion between these slits is raised up by plastic deformation to form a bridge portion 122. That is, the bridge portion 122 is formed in a mountain-shape, protruding upward with slopes formed to the left and the right. The front-back width of the bridge portion 122 is substantially the same as, or slightly smaller than the front-back width of the hole 112. A gap in the front-back direction is formed between this bridge portion 122 and the upper surface of the second part to be welded 121.

The positioning portion 110 is formed as shown in FIG. 8B by the bridge portion 122 of the part to be welded 121 being inserted into the hole 112 of the first part to be welded 111, as shown in FIG. 8A. Then, with the protruding portion 122 engaged with the hole 112 at this positioning portion 110, the second part to be welded 121 is positioned with respect to the first part to be welded 111, and welding is performed.

With the positioning portion 110 structured as described above, the front-back width of the protruding portion 122 is substantially the same as, or slightly smaller than the front-back width of the hole 112. Therefore, movement of the first part to be welded 111 with respect to the second part to be welded 121 in the front-back direction is restricted. That is, even if the first part to be welded 111 tries to move in the front-back direction with respect to the second part to be welded 121, the front end portion and the rear end portion of the protruding portion 122 will abut against the front side and the rear side of the inner peripheral surface of the hole 112, so the first part to be welded 111 is only able to move within a small range with respect to the second part to be welded 121.

On the other hand, the positioning portion 110 is formed such that the first part to be welded 111 is able to move in the left-right direction with respect to the second part to be welded 121. That is, because the left-right length of the protruding portion 122 is smaller than the left-right length of the hole 112, when the first part to be welded 111 tries to move in the left-right direction with respect to the second part to be welded 121, the first part to be welded 111 is not restricted from moving with respect to the second part to be welded 121 in the left-right direction.

As described above, in the positioning portion 110, the first part to be welded 111 is restricted from moving in one direction with respect to the second part to be welded 121. That is, with the welding structure according to this example embodiment as well, the front-back direction in which the first part to be welded 111 is restricted from moving with respect to the part to be welded 121 is a positioning direction D1 as shown in FIG. 8B. Also, the left-right direction, which is perpendicular to the positioning direction D1 and in which the first part to be welded 111 is able to move with respect to the part to be welded 121, is a movable direction D2, as shown in FIG. 8B. The arrangement and the like of the positioning portion 110 is substantially the same as in the first example embodiment described above, so a detailed description thereof will be omitted hereinafter.

Figure 9A:
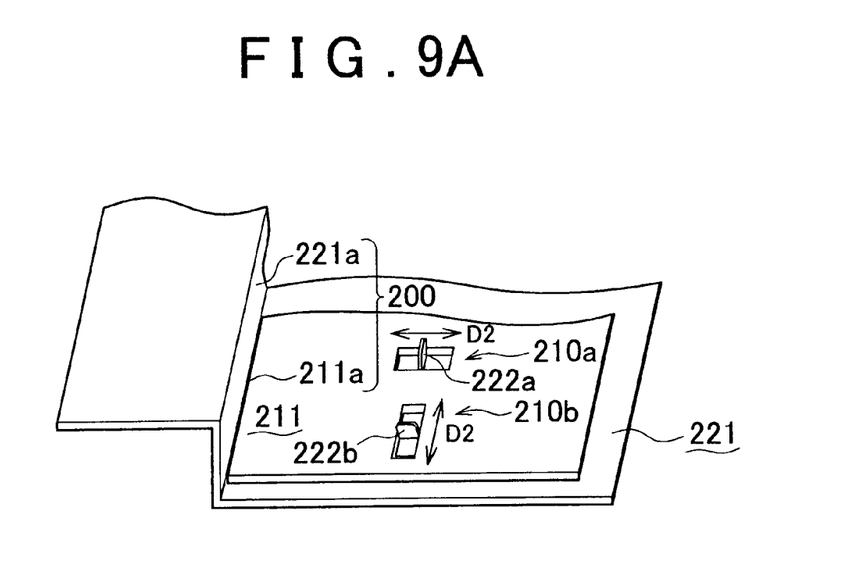
FIG. 9A is a perspective view of parts to be welded that are used in a welding structure according to a third example embodiment of the invention.

Next, the welding structure according to a third example embodiment of the invention will be described with reference to FIG. 9A. As shown in FIG. 9A, the welding structure according to this example embodiment is used to position a sheet-shaped second part to be welded 221 that has a crank-shaped cross-section with respect to a sheet-shaped first part to be welded 211, and weld the first part to be welded 211 to the second part to be welded 221.

Positioning portions 210a and 210b as in the first example embodiment described above are formed in the welding structure of this example embodiment. That is, rectangular holes are opened in the first part to be welded 211, while protruding portions 222a and 222b are formed on the second part to be welded 221. The positioning portions 210a and 210b are formed by the protruding portions 222a and 222b being inserted into the holes. Then with the protruding portions 222a and 222b engaged with the holes at these positioning portions 210a and 210b, the second part to be welded 221 is positioned with respect to the first part to be welded 211 and welding is performed.

In the welding structure according to this example embodiment, the second part to be welded 221 is formed in a crank-shaped cross-section, as shown in FIG. 9A. That is, a side surface 221a is formed in the left side of the second part to be welded 221. Then, the second part to be welded 221 is positioned with respect to the first part to be welded 211, with a left side portion 211a of the first part to be welded 211 abutted against the side surface 221a of the second part to be welded 221. In other words, the shapes of the left side portion 211a and the side surface 221a are used as positioning shapes when the left side portion 211a and the side surface 221a restrict the mutual rotation and movement of the first part to be welded 211 and the second part to be welded 221. That is, positioning is performed by abutting the left side portion 211a against the side surface 221a.

As described above, in this example embodiment, the shapes of the left side portion 211a and the side surface 221a are used for positioning by abutting the left side portion 211a of the first part to be welded 211 against the side surface 221a of the second part to be welded 221. Therefore, there are two positioning portions formed by the holes formed in the first part to be welded and the protruding portions formed on the second part to be welded, i.e., one positioning portion 210a that restricts the first part to be welded 211 from moving in the front-back direction with respect to the second part to be welded 221, and one positioning portion 210b that restricts the first part to be welded 211 from moving in the left-right direction with respect to the second part to be welded 221. Thus, the number of holes formed in the first part to be welded and the number of protruding portions formed on the second part to be welded can be reduced as compared with the first example embodiment. The left side portion 211a of the first part to be welded 211 and the side surface 221a of the second part to be welded 221 together form a positioning portion 200.

Figure 9B:
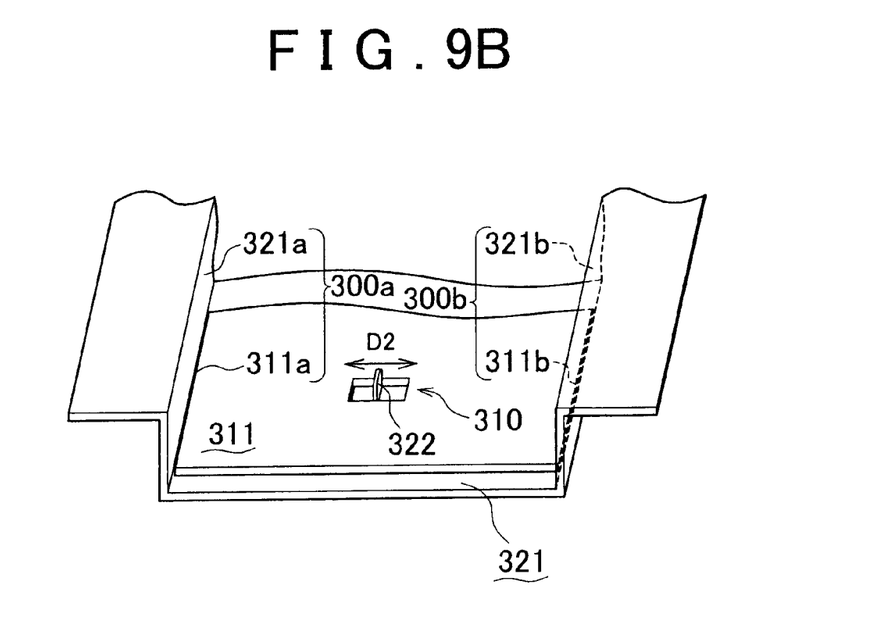
FIG. 9B is a perspective view of parts to be welded that are used in a welding structure according to a fourth example embodiment of the invention.

Next, a welding structure according to a fourth example embodiment of the invention will be described with reference to FIG. 9B. As shown in FIG. 9B, the welding structure of this example embodiment is used to position a sheet-shaped second part to be welded 321 that has an upside down hat-shaped cross-section with respect to a sheet-shaped first part to be welded 311, and weld the first part to be welded 311 to the second part to be welded 321.

A positioning portion 310 as in the first example embodiment described above is formed in the welding structure of this example embodiment. That is, a rectangular hole is opened in the first part to be welded 311, while a protruding portion 322 is formed on the second part to be welded 321. The positioning portion 310 is formed by the protruding portion 322 being inserted into the hole. Then, with the protruding portion 322 engaged with the hole at the positioning portion 310, the second part to be welded 321 is positioned with respect to the first part to be welded 311 and welding is performed.

In the welding structure according to this example embodiment, the second part to be welded 321 is formed with an upside-down hat-shaped cross-section, as shown in FIG. 9B. That is, side surfaces 321a and 321b are formed in the left and right sides, respectively, of the second part to be welded 321. Then, the second part to be welded 321 is positioned with respect to the first part to be welded 311, with left and right side portions 311a and 311b of the first part to be welded 311 abutted against the side surfaces 321a and 321b of the second part to be welded 321. In other words, the shapes of the left and right side portions 311a and 311b and the side surfaces 321a and 321b are used as positioning shapes when the left and right side portions 311a and 311b and the side surfaces 321a and 321b restrict the mutual rotation and movement of the first part to be welded 311 and the second part to be welded 321. That is, positioning is performed by abutting the left and right side portions 311a and 311b against the side surfaces 321a and 321b.

As described above, in this example embodiment, the shapes of the left and right side portions 311a and 311b and the side surfaces 321a and 321b are used for positioning by abutting the left and right side portions 311a and 311b of the first part to be welded 311 against the side surfaces 321a and 321b of the second part to be welded 321. Therefore, there is one positioning portion formed by the hole formed in the first part to be welded and the protruding portion formed on the second part to be welded, i.e., the positioning portion 310 that restricts the first part to be welded 311 from moving in the front-back direction with respect to the second part to be welded 321. Thus, the number of holes formed in the first part to be welded and the number of protruding portions formed on the second part to be welded can be reduced as compared with the first example embodiment. The side portion 311a and the side surface 321a together form a positioning portion 300a, and the side portion 311b and the side portion 321b together form a positioning portion 300b.

The invention claimed is:

1. A welding structure comprising:
   a sheet-shaped first part to be welded;
   a sheet-shaped second part to be welded that is positioned with respect to the first part to be welded by engaging with the first part to be welded, in order to weld the second part to be welded to the first part to be welded; and
   a first positioning portion, a second positioning portion, and a third positioning portion, at which the first part to be welded engages with the second part to be welded,
   wherein the first positioning portion, the second positioning portion, and the third positioning portion are each configured to restrict movement of one of the first part to be welded and the second part to be welded, in a positioning direction that is one direction, with respect to the other of the first part to be welded and the second part to be welded, and enable movement of the one of the first part to be welded and the second part to be welded, in a movable direction that is perpendicular to the positioning direction, with respect to the other of the first part to be welded and the second part to be welded; and the first positioning portion, the second positioning portion, and the third positioning portion are arranged such that the movable direction of each of the first positioning portion and the second positioning portion is the same direction as the positioning direction of the third positioning portion,
   wherein the first positioning portion, the second positioning portion, and the third positioning portion are arranged such that a distance between the first positioning portion and the second positioning portion in the movable direction is greater than a distance between the first positioning portion and the second positioning portion in the positioning direction, and a distance between the first positioning portion and the second positioning portion is greater than whichever is smaller of a distance between the first positioning portion and the third positioning portion, and a distance between the second positioning portion and the third positioning portion, wherein the first part to be welded includes a groove that extends in a length direction, and the first positioning portion and the second positioning portion are arranged such that the movable direction of each of the first positioning portion and the second positioning portion is parallel with the length direction of the first part to be welded, wherein the first part to be welded includes first and second side section, a central raised section, and first and second vertical sections connecting the central raised section to the first and second side sections, respectively, the first and second vertical sections and the central raised section defining the groove, and wherein the first positioning portion and the second positioning portion are provided on the first side section, and the third positioning portion is provided on the second side section.

2. The welding structure according to claim 1, wherein the first positioning portion, the second positioning portion, and the third positioning portion are each formed by inserting a protruding portion formed on the second part to be welded into a hole formed in the first part to be welded.

3. The welding structure according to claim 1, wherein the first positioning portion, the second positioning portion, and the third positioning portion are each formed by inserting a bridge portion formed on the second part to be welded into a hole formed in the first part to be welded; and the bridge portion is formed by forming two slits in the second part to be welded and raising a portion between the slits by plastic deformation.

4. The welding structure according to claim 1, wherein the distance between the first positioning portion and the second positioning portion in the positioning direction is 0.

5. A welding method comprising:
positioning a sheet-shaped second part to be welded with respect to a sheet-shaped first part to be welded by engaging the first part to be welded with the second part to be welded at a first positioning portion, a second positioning portion, and a third positioning portion; and
welding the first part to be welded to the second part to be welded,
wherein the first positioning portion, the second positioning portion, and the third positioning portion are each configured to restrict movement of one of the first part to be welded and the second part to be welded in a positioning direction that is one direction, with respect to the other of the first part to be welded and the second part to be welded, and enable movement of the one of the first part to be welded and the second part to be welded, in a movable direction that is perpendicular to the positioning direction, with respect to the other of the first part to be welded and the second part to be welded; and the first positioning portion, the second positioning portion, and the third positioning portion are arranged such that the movable direction of each of the first positioning portion and the second positioning portion is the same direction as the positioning direction of the third positioning portion,
wherein the first positioning portion, the second positioning portion, and the third positioning portion are arranged such that a distance between the first positioning portion and the second positioning portion in the movable direction is greater than a distance between the first positioning portion and the second positioning portion in the positioning direction, and a distance between the first positioning portion and the second positioning portion is greater than whichever is smaller of a distance between the first positioning portion and the third positioning portion, and a distance between the second positioning portion and the third positioning portion, wherein the first part to be welded includes a groove that extends in a length direction, and the first positioning portion and the second positioning portion are arranged such that the movable direction of each of the first positioning portion and the second positioning portion is parallel with the length direction of the first part to be welded, wherein the first part to be welded includes first and second side section, a central raised section, and first and second vertical sections connecting the central raised section to the first and second side sections, respectively, the first and second vertical sections and the central raised section defining the groove, and wherein the first positioning portion and the second positioning portion are provided on the first side section, and the third positioning portion is provided on the second side section.

6. The welding method according to claim 5, wherein the first positioning portion, the second positioning portion, and the third positioning portion are each formed by inserting a protruding portion formed on the second part to be welded into a hole formed in the first part to be welded.

7. The welding method according to claim 5, wherein the first positioning portion, the second positioning portion, and the third positioning portion are each formed by inserting a bridge portion formed on the second part to be welded into a hole formed in the first part to be welded; and the bridge portion is formed by forming two slits in the second part to be welded and raising a portion between the slits by plastic deformation.

8. The welding method according to claim 5, wherein the distance between the first positioning portion and the second positioning portion in the positioning direction is 0.

9. A welding structure comprising:
a sheet-shaped first part to be welded;
a sheet-shaped second part to be welded that is positioned with respect to the first part by engaging the first part in order to weld the second part to the first part; and
a first positioning portion, a second positioning portion, and a third positioning portion, at which the first part engages the second part,
wherein the first positioning portion and the second positioning portion are each configured to restrict movement of the first part, in a first positioning direction, with respect to the second part, and to enable movement of the first part, in a first movable direction that is perpendicular to the first positioning direction, with respect to the second part;
wherein the third positioning portion is configured to restrict movement of the first part, in a second positioning direction, with respect to the second part, and to enable movement of the first part, in a second movable direction, with respect to the second part;
wherein the first positioning portion, the second positioning portion, and the third positioning portion are arranged such that the first movable direction is identical to the second positioning direction,
wherein the first part includes a groove that extends in a length direction, and the first positioning portion and the second positioning portion are arranged such that the first movable direction is parallel with the length direction of the first part, wherein the first part includes a raised section defining the groove, and wherein the first positioning portion and the second positioning portion are provided on the first part on a first lateral side of the raised section, and the third positioning portion is provided on the first part on a second lateral side of the raised section.

\* \* \* \* \*